Patented Dec. 12, 1939

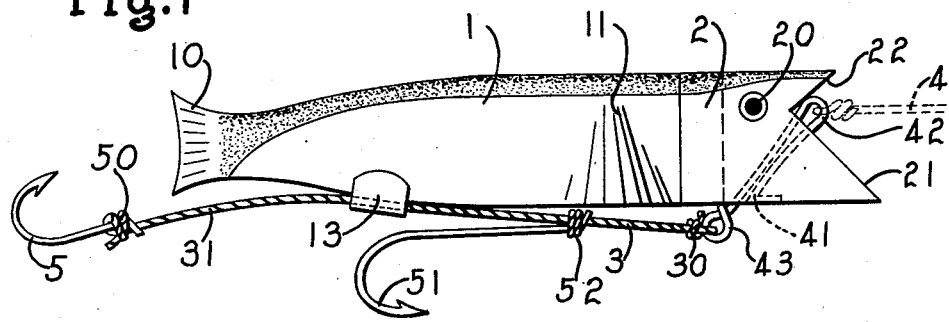
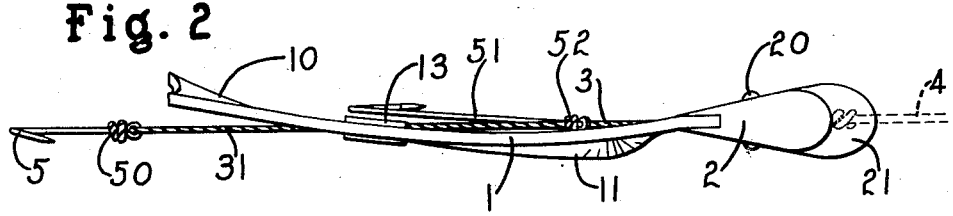
Inventor
Sydney E. Bacon
By Charles L. Reynolds
Attorney

2,183,059

UNITED STATES PATENT OFFICE 2,183,059

FISH LURE

Sydney E. Bacon, Seattle, Wash.

Application April 18, 1938, Serial No. 202,706

8 Claims. (Cl. 43—46)

My invention relates to fish lures or artificial bait, and has for its principal object the provision of a lure which will closely simulate the swimming action of a minnow.

My lure is not to be confused with those lures which dart about from point to point in the water, for it moves substantially in a straight line. Neither is it to be confused with devices which by spinning or other movement attract by the mere fact of movement, or by reflection of light from polished surfaces or the like, for my lure maintains an upright position when drawn through the water.

A fish advances through the water by wiggling its tail from side to side, bowing its body, and it is this action which my lure simulates, while maintaining a substantially straight line of movement in general.

Thus it will be seen that it is my object to provide a lure which in its general form and appearance simulates a minnow, and which further simulates a minnow by a movement which closely resembles the action of a minnow while swimming, and depends for its effectiveness (which has been demonstrated by trial), not upon darting or irregular movements, not upon flashing or light attractiveness (though such expedients may be resorted to in addition, if desired), but rather upon its close simulation of the actions in particular, and additionally of the appearance, of a minnow while swimming.

It is a further object of my invention to provide such a lure which can be made up inexpensively, and which is durable under the conditions of use, and which in particular will not be damaged when a fish strikes.

It is a further object to provide such a lure which may have attached to it ordinary fish hooks, which if lost or damaged can be easily and immediately replaced, thereby enabling the bait to be continued in use.

It is a further object to provide such a lure in which the action of the lure may be changed or modified at the will of the user, and without more than drawing it out of the water and adjusting it by hand, while it is in use.

With these and other objects in mind, as will appear hereafter, my invention comprises the novel lure, made up of the materials hereinafter specified, or their equivalents, and arranged in the manner hereinafter disclosed, all as is shown in the accompanying drawing, described in this specification, and as will be more particularly defined by the claims.

In the accompanying drawing I have shown my invention embodied in a single form, as is now preferred by me, but it will be apparent that the principles thereof may be adapted to various and different forms of execution.

Figure 1 is a side elevation of the complete lure, as arranged for use, and Figure 2 is a top plan view of the same.

Figure 3 is a diagram, illustrating the action of the lure and its position at one instant, and Figure 4 is a similar diagram illustrating its position and action an instant later.

The invention resides principally in the body portion, though the formation of the head is important inasmuch as the head is relied upon to maintain the body always in an upright plane. To this end the head consists of a member 2, which may have beads simulating the eyes 20, and which is provided at its forward end with water reactant planes 21 and 22, which when drawn through the water serve to keep the head upright. The surface 21 is designedly larger than the surface 22, for if the head is made of buoyant material, as wood, which tends to cause the lure to rise, the inclined surface 21 serves to hold the lure down in the water to a proper level.

The rear end of the head is slotted, and in this slot is cemented or otherwise secured the forward end of a strip of material, the characteristics of which are important. In form this strip may simulate the body portion and tail of a fish, and it may be suitably decorated or painted to further simulate a fish, as may also the head. If the lower portion of the strip is white, it will attract by its color, the white simulating the light belly portion and the silver sides of a minnow. The top may be a darker color.

The strip 1 must be somewhat flexible, yet it must have appreciable inherent stiffness. The material which best meets these and other requirements is sheet rubber of appreciable thickness and consequent inherent stiffness, yet it can be flexed. Furthermore, rubber is substantially indestructible under such conditions of use, and will not be damaged by the striking of a fish.

A tension member, such as the cord 3, is disposed along one edge of the minnow, preferably along the belly portion of the body, but wholly outside of the margin of the strip. At its forward end it is secured, as by the knot 30 to a point of attachment, such as the loop or ring 43, disposed beneath the head, preferably at the rear end of the head. Thence the cord extends rearwardly beneath the strip 1 to a second point of attachment which is located intermediate the ends of the strip, and well ahead of the tail 10.

A convenient and suitable point of attachment has been found to be at about the location of the vent. Preferably the cord is not permanently attached at one such point, but is adjustable lengthwise with respect thereto. It is shown as extended through a longitudinal guide 13, which may be formed by folding a short piece of rubber about the lower edge of the strip 1 and cementing it to the sides thereof, this guide 13 frictionally engaging the cord or tension member 3, and holding the latter in any adjusted position lengthwise of the guide. The free end 31 of the cord trails behind the point of attachment at 13, and a hook 5 is attached to this free end, as by the knot 50, the hook being disposed in the vicinity of the tail 10 of the lure, but being connected to the lure only by its connection to the trailing end 31 of the cord. A further hook 51 may be attached to the cord 3 intermediate its points of securement at 30 and 13, as by the knot 52, and again it will be noted that the hook 51 is not directly connected in any way to the strip 1.

By pulling the cord 3 rearwardly through the guide 13 its effective length between the points of securement 43 and 13 may be made shorter than the length of the adjacent edge of the strip 3, and in consequence the strip is bowed, as indicated at 11, between these points, it being flexible to an extent to permit this. The bow, of course, will cause this intermediate portion of the strip to lie at one side or the other of the cord 3, but because of the inherent stiffness of the strip the tail 10 will lie at the opposite side of the cord.

The lure is drawn through the water by a line 4 attached to the head. An eye 42 is shown for the attachment of the line, and it is immaterial what may be the character of the line at the point of attachment, whether or not a swivel or like attachment be employed. Preferably the loops or rings 42 and 43 are formed of one piece of wire which is extended through the head, as indicated at 41, whereby the cord 3 is in effect a rearward continuation of the line 4.

Now with the lure drawn through the water by the line 4, and bowed at 11 between the points 43 and 13, the water will react to some extent upon the bowed portion 11, and with greater effect upon the offset or oppositely directed tail 10, which, as in a fish, acts as a rudder, with an appreciable turning movement. By this water reaction the tail, having some stiffness, will snap to the opposite side of the cord 3, but in so doing the stiffness of the strip will cause the bow 11 to be snapped also to the other side of the cord, so that the bowed portion 11 and the tail 10 are again at opposite sides of the cord 3. The initial position is shown in Figure 3, and the second position, an instant later, is shown in Figure 4. Now a new set of forces is set up, the water reacting again upon the bowed portion 11 and with greater force upon the tail 10, and again the tail snaps to the opposite side of the cord 3, that is, back to its initial position, and by its stiffness snaps the bowed portion 11 back to its original position, but on the side of the cord opposite the new position of the tail. In other words, the tail 10 and bowed portion 11 lie always on opposite sides of the cord, by reason of the inherent stiffness of the material, aided by the water reaction upon the tail and upon the bowed portion. This movement back and forth takes place rapidly, as is the case with a minnow swimming, and without wide departure sideways from a straight path, nor is there any sudden departure from a level path, for the head and its surfaces 21 and 22 serve to keep the lure as a whole upright, and to maintain a substantially level path of movement thereof. They may assist somewhat in giving a slightly undulating movement to the lure as a whole, and in this further respect assist the tail to snap back and forth across the cord 3.

The user, after some experience with this lure, will probably apply an index mark to the cord 3 to register with an end of the guide 13, to indicate subsequently the best position of adjustment. Too much bowing of the portion 11 will create too much resistance to the bowed portion 11 snapping back and forth under the influence of the tail acting as a rudder or lever, and will cause the bowed portion merely to bag and collect water. Too little bowing will not accomplish the desired action or amplitude or periodicity of movement. The proper position can be ascertained for any conditions, and the cord can be marked to indicate this position. This position again may vary with the speed with which the lure is to be drawn through the water, and because of such factors a single position cannot be indicated as the most desirable under all conditions. It must be kept in mind that the cord 3 must at all times lie outside of the general outline of the body portion 1, so that the latter will not impinge upon nor be interfered with by any engagement of the cord with its lower edge.

Such a lure drawn through the water and simulating the swimming action of a minnow will attract fish because of its very life-like appearance and action, and by its absence of unnatural movements. Actual experience with such a lure has shown that it is highly attractive to fish. It is capable of being repaired on the spot, for it is practically indestructible except as to the hooks or cord, and should a hook become bent or broken it may be untied and a new one put on in its place, or a broken cord can be repaired, and the user may continue fishing with the same lure.

What I claim as my invention is:

1. A fish lure comprising a strip of sheet rubber or the like, of appreciable thickness and consequent inherent stiffness, yet flexible, a tension member extending, outside of the general outline of the strip, from a point adjacent its head end to a point intermediate its two ends, but well in advance of its tail end, and fixed to the strip at such points, its length between such points being less than the length of the adjacent edge of the strip beween the same points, whereby to hold the strip bowed to one side of the tension member, with its tail end held by the inherent stiffness of the strip to the opposite side of he tension member, to serve by water reaction, as the lure is drawn through the water, as a lever to repeatedly snap the bowed portion across to the opposite side of the tension member, and the tail itself simultaneously to the other side, opposite the new position of the bowed portion, simulating the wiggling of a fish's tail in swimming, and a fish hook separate from but attached to said tension member.

2. A fish lure comprising a strip of sheet rubber of appreciable inherent stiffness, yet flexible, a head secured at its forward end and formed with water-reactant surfaces tending to maintain the strip in a vertical plane when drawn through the water, means to attach a line to the head, a tension member connecting the head and a point at an edge of the strip intermediate its ends but well in advance of its tail end, and extending outside the general outline of the strip, the tension member being of less length, between its points of securement, than the adjacent edge of the strip, whereby to hold the strip normally bowed to one side of the tension member, and by its inherent stiffness tending to hold the tail end of the strip to the opposite side of the tension member, to serve by water reaction as a lever to repeatedly snap the bowed portion to the opposite side of the tension member, and itself, simultaneously, to the other side thereof, and a fish hook attached to said tension member.

3. A fish lure comprising a strip of material having inherent stiffness, yet flexible, means to attach a line to its forward end, a tension member connecting its forward end to a point intermediate its forward and rear ends, to hold the strip normally flexed, the tension member extending outside the general outline of the strip, and a fish hook attached to said tension member, but otherwise unconnected to the lure.

4. A fish lure as in claim 1, having a longitudinal guide constituting one of the points of securement for the tension member, and frictionally engaging the tension member, for adjustment of its length relative to the adjacent edge of the strip, and consequently for adjustment of the degree of bowing of the intermediate portion of the strip.

5. A fish lure as in claim 1, wherein the tension member extends rearwardly and freely behind the rear point of securement to the strip, and wherein the hook is attached to the free trailing end of the tension member, in the vicinity of the tail end of the strip, but is not otherwise connected to the lure.

6. A fish lure as in claim 1, wherein the fish hook is attached to the tension member intermediate its points of securement to the strip.

7. A fish lure as in claim 1, wherein the tension member extends rearwardly of and trails freely behind its rear point of securement to the strip, and wherein one hook is attached to the trailing end of the tension member, in the vicinity of the tail of the strip, and a second hook is attached to the tension member intermediate its points of securement to the strip, but neither hook is otherwise connected to the lure.

8. A fish lure comprising a head formed of buoyant material, and having water reactant surfaces tending to maintain it upright when drawn through the water, a strip of sheet rubber or the like, of appreciable thickness and consequent inherent stiffness, yet flexible, shaped in simulation of a fish's body, secured to the head and held by the latter normally in an upright plane, means to secure a line to the head, a cord attaching point projecting below the head, a longitudinal frictional guide projecting below the belly portion of the strip, at about the region of the vent, a cord disposed wholly below the belly portion of the strip, secured to the attaching point and extending through the guide, whereby the latter will frictionally hold the cord to an effective length less than the length of the adjacent belly portion of the strip, to hold the latter bowed to one side of the cord, and the tail, by reason of the stiffness of the strip, to the opposite side of the cord, and whereby the tail by water reaction will snap the bowed portion repeatedly to the opposite side of the cord and itself to the other side, opposite the new position of the bowed portion, the cord trailing freely behind the guide, and a fish hook secured to the trailing end of the cord, in the vicinity of the tail of the strip.

SYDNEY E. BACON.